United States Patent Office 3,213,091
Patented Oct. 19, 1965

3,213,091
MERCAPTOETHYLATION OF AMINES WITH
ETHYLENE MONOTHIOLCARBONATE
Delbert D. Reynolds, Rochester, N.Y., assignor to Eastman Kodak Company, Rochester, N.Y., a corporation of New Jersey
No Drawing. Filed Apr. 26, 1961, Ser. No. 105,568
6 Claims. (Cl. 260—247.1)

This application is a continuation-in-part of copending application 721,678 filed March 17, 1958, now abandoned, which was a continuation-in-part of application Serial No. 647,499, filed March 21, 1957, now Patent No. 2,828,318.

This invention concerns a process for introducing the mercaptoethyl radical into amines, more particularly mercaptoethylating amines, and preparing 2-mercaptoethyl carbamates.

Mercaptans and their derivatives are required for use in many applications, particularly for use in the rubber industry, as disclosed by H. R. Snyder et al., J. Amer. Chem. Soc., 69, 2672 (1947). They are also useful in the pharmaceutical field as disclosed by R. O. Clinton et al., J. Amer. Chem. Soc., 70, 950 (1948), and in the photographic industry in photographic emulsions and the like.

One broad class of useful mercaptan derivatives is the mucaptoethyl derivatives, in particular those derived from amines and having the general formula $RR'NCH_2CH_2SH$, where R and R' are hydrogen, alkyl, aryl or aralkyl. Three methods have customarily been used to synthesize these compounds. One involves the reaction of aminoethyl halides with hydrosulfides of the alkali metals. Another is based on the condensation of aminoethyl halides with thiourea followed by alkaline hydrolysis. A third and more preferred method is the mercaptoethylation of primary and secondary amines by reaction with ethylene sulfide. This process leaves much to be desired because of the difficulties encountered in handling ethylene sulfide. Ethylene sulfide readily polymerizes and cannot be stored safely in large quantities. Hence this process is not suitable for mercaptoethylation on a large scale.

In my U.S. Patent No. 2,828,318, which issued March 25, 1958, a process is disclosed for preparing ethylene sulfide which involves the thermal decomposition of ethylene monothiolcarbonate according to the following equation:

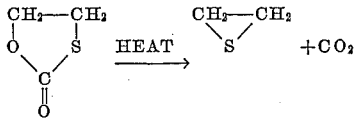

The ethylene monothiolcarbonate is a high-boiling liquid which is stable under normal conditions and therefore, unlike ethylene sulfide, it can be kept for extended periods of time. Like ethylene sulfide, however, it reacts with primary or secondary amines to yield mercapto derivatives.

One object of this invention is to obtain mercaptoethyl derivatives by the mercaptoethylation of primary or secondary amines. Another object is to provide a mercaptoethylation process which avoids the difficulties inherent in using ethylene sulfide due to its inclination for polymerization. An additional object is to obtain mercaptoethyl derivatives.

The invention is illustrated by the reaction in which ethylene monothiolcarbonate is treated with greater than one mole of a typical amine to yield an aminoethanethiol and carbon dioxide. This reaction can be called mercaptoethylation of an amine.

Ethylene monothiolcarbonate may be reacted with one mole or less of any primary or secondary amine which may be aliphatic or cyclic to form carbamates. Any amine with a replaceable hydrogen atom is operative in this process including diamines. The resulting product has a general formula of $G[CO_2CH_2CH_2SH]_n$ or of $G[CO_2CH_2CH_2S(Q)]_n$ in which $n$ is 1 or 2, and G and Q are defined herein. The preparation of these carbamates is preferably carried out at 0 to 25° C.

Primary and secondary mercaptoethylamines which are aliphatic, aromatic, or cyclic may be prepared by reacting the amines with $B[CO_2CH_2CH_2S(Q)]_n$ (i.e. mercaptoethylating amines using 2-mercaptoethyl carbamates) where B is G, anilino, alkyl or alkoxy ($C_1$–$C_4$) ring-substituted anilino, halogen-substituted anilino, and phenylenediamino. When B is derived from an aromatic amine, the $B[CO_2CH_2CH_2S(Q)]_2$ is obtainable from reacting the corresponding isocyanate or diisocyanate with $$HOCH_2CH_2S(Q)$$

and a basic catalyst is required in its subsequent use as a mercaptoethylating agent.

The process may be carried out by mercaptoethylating primary and secondary amines which are aliphatic, aromatic, or cyclic amines by reacting ethylene monothiolcarbonate with greater than one mole of amines.

When pure, ethylene monothiolcarbonate is stable at reflux temperature (237° C.). However, in the presence of a base, including amines, it decomposes to yield ethylene sulfide and $CO_2$. However, an alkaline catalyst such as sodium methoxide is required to decompose the ethylene monothiolcarbonate when the amine reactant is aromatic. The ethylene sulfide then reacts with the amine to form a mercaptoethylamine.

In general, any amino function in the presence of other nonparticipating function, for example, polyamines, polyimines, amino acids, polypeptides, proteins, amino sugars, deacetylated chitin, gelatin, and the like, can be mercaptoethylated.

Using the process of reacting ethylene monothiolcarbonate with one mole or less of an amine, new carbamates can be prepared which are mercaptoethylating agents of the formula:

$$G[CO_2CH_2CH_2S(Q)]_n$$

in which the Q may be H, COR, $CO_2R$, COG and $—C(NH)NH_2 \cdot HX$ in which X may be chloride or bromide; and $n$ may be 1 or 2. When $n$ is 1, G may be RHN—, RRN—, and ZN—, where R is alkyl ($C_1$–$C_{18}$) or cycloalkyl and Z may be 4 or 5 atoms necessary to complete a heterocyclic ring with N. The atoms may be all carbon atoms or an oxygen or nitrogen atom combined with three or more carbon atoms. When $n$ is 2, G may be

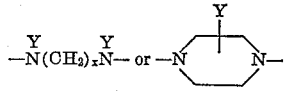

where Y is hydrogen or R (defined above) and $x$ is 2 to 18.

The following examples are intended to illustrate my invention but are not intended to limit it in any way.

EXAMPLE 1.—ETHYLENE MONOTHIOLCARBONATE

A mixture of 750 g. (5.0 moles) of ethyl 2-hydroxyethylthiolcarbonate, B.P. 108° C./5 mm., $n_D^{25}$ 1.4782, 190.5 g. (1.0 mole) of p-toluenesulfonic acid monohydrate and 1.5 l. of benzene was refluxed for 4 hours under an 18″ glass-helices packed distillation apparatus. During this period the benzene-water-alcohol and then the benzene-alcohol azeotropes were continuously distilled at a rate to maintain a stillhead temperature of 70° C.

The reaction mixture was cooled and the polymer formed during the reaction further precipitated by the addition, with stirring, of 1.5 l. of ether. After filtering off the polymer, the acidic filtrate was neutralized with an aqueous sodium carbonate solution (62.0 g., 0.05 mole, of sodium carbonate in 500 ml. of water) and the pH adjusted to about 6 by the addition of 10 ml. of glacial acetic acid. The organic layer was separated, stabilized with 20.0 g. of stearic acid, and distilled under reduced pressure through an 18″ glass-helices packed column to yield 384 g. (73.6 percent) of product, B.P. 75°/1.0 mm., $n_D^{25}$ 1.5104. To prevent possible contamination of product during distillation, it was found necessary to remove a small amount of white crystalline material identified as 1,4-dithiane (M.P. 105°. Calcd.: C, 40.0; H, 6.7. Found: C, 39.5; H, 6.5) from the cold finger just prior to the distillation of the ethylene monothiolcarbonate.

EXAMPLE 2.—2-DIETHYLAMINOETHANETHIOL

One mole (73 g.) of diethylamine was refluxed with 150 ml. of anhydrous toluene. One-half mole (52 g.) of ethylene monothiolcarbonate was added through a dropping funnel and the refluxing continued for sixteen hours. The toluene was removed under reduced pressure, and the reaction products distilled at 83–85° at 57 mm. through a 10″ x 1″ glass column packed with glass helices, and equipped with a variable-take-off still head. Forty-one and five-tenths g. (62.4 percent) of 2-diethylaminoethanethiol were collected. $n_D^{25}=1.4650$. Redistillation of 84–85° at 55 mm. gave $n_D^{25}=1.4632$.

*Anal.*—Calc'd for $C_3H_{15}NS$: C, 54.1; H, 11.3; N, 10.5; S, 24.1. Found: C, 54.1; H, 11.3; N, 10.3; S, 23.9.

A higher boiling fraction (7.5 g.) B.P. 85–150° at 57 mm. was obtained from this first distillation. A high sulfur and low carbon also low nitrogen content indicates it is composed of high mercaptoethylation products.

EXAMPLE 3.—2-DI-n-BUTYLAMINOETHANETHIOL

One mole (129 g.) of di-n-butylamine was refluxed in 150 ml. of anhydrous dioxane. One-half mole of ethylene monothiolcarbonate was added and the refluxing continued for 15.5 hours. The dioxane was removed under reduced pressure and 200 ml. of toluene added. After washing the toluene with cold water, the excess dibutylamine and toluene were distilled at reduced pressure. 2-di-n-butylaminoethanethiol was then distilled. Yield 60 g. (63%); B.P. 60° at 0.3 mm., $n_D^{25}=1.4620$.

*Anal.*—Calc'd for $C_{10}H_{23}NS$: C, 63.5; H, 12.1; N, 7.4; S, 16.9. Found: C, 63.6; H, 12.1; N, 7.6; S, 16.9.

EXAMPLE 4.—2-PIPERIDINOETHANETHIOL

One mole of piperidine (85 g.) was refluxed in 150 ml. of anhydrous toluene. One-half mole of ethylene monothiolcarbonate was added and the refluxing continued for seventeen hours. The toluene and excess piperidine were distilled at atmospheric pressure through a 12″ glass packed column. The undistilled product contained some piperidine carbonate. After cooling, it was mixed with 400 ml. of ether and washed with 100 ml. of cold water. After drying over $MgSO_4$, the ether was distilled. The 2-piperidinoethanethiol (51 g.) distilled at 84° at 14 mm. $n_D^{25}=1.4989$. Yield 70%.

*Anal.*—Calc'd for $C_7H_{15}NS$: C, 58.0; H, 10.3; N, 9.7; S, 22.0. Found: C, 57.9; H, 10.5; N, 9.7; S, 21.5.

EXAMPLE 5.—2-MORPHOLINOETHANETHIOL

One mole of morpholine (87 g.) was refluxed in 150 ml. anhydrous toluene. After adding 52 g. (0.5 mole) of ethylene monothiolcarbonate the solution was refluxed for seven hours. After cooling, the solution was washed with cold water to remove morpholine carbonate. Distillation yielded 42 g. of 2-morpholinoethanethiol (57%)

$$n_D^{25}=1.5022$$

*Anal.*—Calc'd for $C_6H_{19}NOS$: C, 48.9; H, 8.8; N, 9.5; S, 21.8. Found: C, 48.8; H, 8.7; N, 9.0; S, 21.7.

EXAMPLE 6.—2-BENZYLAMINOETHANETHIOL

One mole of benzylamine (107 g.) was refluxed in 150 ml. of anhydrous toluene. One-half mole of ethylene monothiolcarbonate was added and refluxing continued for eighteen and one-half hours. The reaction mixture was washed with 200 ml. of cold water, dried over $MgSO_4$ and distilled. Fifty-three g. (63%) of 2-benzylaminoethanethiol was obtained; B.P. 97–110° at 0.8—1.2 mm. $n_D^{25}=1.5590$.

*Anal.*—Calc'd for $C_9H_{13}NS$: N, 8.4; S, 19.1. Found: N, 8.6; S, 19.3.

EXAMPLE 7.—DI-n-BUTYLAMINOETHYLMERCAPTOETHANETHIOL

A mixture of 60 g. of di-n-butylaminoethanethiol (0.32 mole), from Example 3, 100 ml. of anhydrous toluene, and 34 g. of ethylene monothiolcarbonate was refluxed for seventeen hours. The reaction mixture was washed with 200 ml. of water and dried over $MgSO_4$. After removal of the toluene, the product was fractionated.

| Fraction | Amount (g.) | B.P. | |
|---|---|---|---|
| 1st | 16 | Approx. 55°/0.5 mm | }$n_D^{25}=1.4713$. |
| 2nd | 4 | 55–115°/0.5 mm | |
| 3rd | 35 | 115°/0.5 mm | |
| 4th | 10 | >115°/0.5 mm. with decomposition. | }$n_D^{25}=1.4918$. |

Fraction 3 represents a 45% yield.

*Anal.*—Calc'd for $C_{12}H_{27}NS_2$: C, 57.8; H, 10.8; N, 5.6; S, 25.7. Found: C, 57.9; H, 10.6; N, 5.6; S, 25.6.

EXAMPLE 8

Since many amines have low-boiling points, very low reaction temperatures are obtained at normal pressure. With aromatic amines a basic catalyst, such as sodium methoxide, is used. By conducting the reaction in a rocking-type autoclave, employing a positive displacement pump to meter the ethylene monothiolcarbonate into the amine-solvent mixture, yields can be significantly improved. A 7 percent yield of 2-isopropylaminoethanethiol was obtained by employing a reaction temperature of about 50° C. at atmospheric pressure.

A 77 percent yield was obtained of 2-isopropylaminoethanethiol by conducting the reaction at 140° C. for 15 minutes in an autoclave. Similar increases in yields were obtained for a number of other low-molecular weight amines, which are marked with an asterisk (*) in Tables I and II, following Example 9. In each instance, the pressure was that generated by the reaction.

EXAMPLE 9

Ethylene monothiolcarbonate was refluxed with a series of amines using a twofold molar excess of the amines, refluxing the amines with the ethylene monothiolcarbonate in toluene overnight using an efficient condenser. The resulting 2-aminoethanethiols were isolated by distillation. These are given in Tables I and II. The yields represented a substantial improvement over those obtained by direct reaction of an amine with ethylene sulfide, and the elimination of the isolation and handling of the sensitive ethylene sulfide allows this process to be used for large-scale use.

Table I

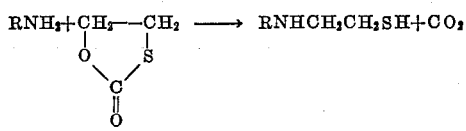

$$RNH_2 + CH_2\text{---}CH_2 \longrightarrow RNHCH_2CH_2SH + CO_2$$
(with O-C(=O)-S ring)

| No. | RNH— | B.P. (°C)/mm. | $n_D^{25}$ | Calculated C | Calculated H | Calculated N | Found C | Found H | Found N |
|---|---|---|---|---|---|---|---|---|---|
| *1 | iso-$C_3H_7$NH— | a 81/64 | | 50.4 | 10.9 | 11.8 | 51.0 | 10.8 | 11.2 |
| *2 | n-$C_4H_9$NH— | 81/18 | 1.4694 | | | | | | |
| *3 | iso-$C_4H_9$NH— | 76/23 | 1.4652 | 54.1 | 11.3 | 10.5 | 53.8 | 11.4 | 10.6 |
| *4 | sec-$C_4H_9$NH— | 83/33 | 1.4676 | 54.1 | 11.3 | 10.5 | 54.2 | 11.3 | 10.4 |
| *5 | tert-$C_4H_9$NH— | b 71/28 | | 54.1 | 11.3 | 10.5 | 54.3 | 10.6 | 10.5 |
| 6 | $CH_2$=$CHCH_2$NH— | 70/16 | 1.4931 | 51.3 | 9.4 | 12.0 | 51.5 | 9.1 | 12.9 |
| 7 | n-$C_6H_{13}$NH— | 97/7 | 1.4680 | | | | | | |
| 8 | n-$C_8H_{17}$NH— | 83/0.3 | 1.4691 | 63.5 | 12.2 | 7.4 | 64.0 | 12.6 | 7.3 |
| 9 | n-$C_{10}H_{21}$NH— | 120/0.6 | 1.4674 | 66.4 | 12.4 | 6.5 | 66.0 | 12.2 | 6.6 |
| 10 | $C_6H_5CH_2$NH— | 84/0.1 | 1.5585 | | | | | | |
| 11 | $C_6H_{11}$NH— | 99/7 | 1.5040 | 60.4 | 10.7 | 8.8 | 60.3 | 10.7 | 8.6 |
| *12 | $C_2H_5$NH— | 75/63 | 1.4751 | | | | | | |
| *13 | n-$C_3H_7$NH— | 82/46 | 1.4720 | | | | | | |
| *14 | $HOCH_2CH_2$NH— | c 74/0.02 | | 39.7 | 9.1 | 11.6 | 39.4 | 8.6 | 11.5 |
| *15 | $C_6H_5$NH— | 100/0.5 | 1.6025 | | | | | | |
| *16 | p-$CH_3C_6H_4$NH— | 91/0.02 | 1.5864 | | | | | | |
| *17 | p-$CH_3OC_6H_4$NH— | 120/0.02 | 1.5915 | | | | | | |
| *18 | p-$ClC_6H_4$NH— | 112/0.02 | 1.6123 | | | | | | | a M.P. 34–35° C.   b M.P. 41–43° C.   c M.P. 61–63° C.

Table II

$$RR'NH + CH_2\text{---}CH_2 \longrightarrow RR'NCH_2CH_2SH + CO_2$$
(with O-C(=O)-S ring)

| No. | RR'N— | B.P. (°C)/mm. | $n_D^{25}$ | Calculated C | Calculated H | Calculated N | Found C | Found H | Found N |
|---|---|---|---|---|---|---|---|---|---|
| 1 | $(C_2H_5)_2$N— | 72/29 | 1.4632 | 54.3 | 11.4 | 10.5 | 54.1 | 11.3 | 10.3 |
| 2 | (n-$C_3H_7)_2$N— | 77/10 | 1.4614 | 59.6 | 11.8 | 8.7 | 59.5 | 11.8 | 8.5 |
| *3 | (iso-$C_3H_7)_2$N— | 73/13 | 1.4686 | 59.6 | 11.8 | 8.7 | 59.3 | 11.8 | 8.7 |
| 4 | (n-$C_4H_9)_2$N— | 66/0.7 | 1.4622 | 63.6 | 12.1 | 7.4 | 64.0 | 12.5 | 7.2 |
| 5 | (iso-$C_4H_9)_2$N— | 91/10 | 1.4572 | 63.5 | 12.2 | 7.4 | 63.7 | 12.3 | 7.4 |
| *6 | (sec-$C_4H_9)_2$N— | 93/8 | 1.4723 | 63.5 | 12.2 | 7.4 | 63.2 | 12.0 | 7.4 |
| 7 | (n-$C_5H_{11})_2$N— | 91/0.8 | 1.4629 | | | | | | |
| 8 | (iso-$C_5H_{11})_2$N— | 85/1 | 1.4600 | | | | | | |
| 9 | $(CH_2$=$CHCH_2)_2$N— | 90/17 | 1.4898 | 61.1 | 9.6 | 8.9 | 61.1 | 10.1 | 9.2 |
| 10 |  (piperidinyl) | 83/11 | 1.5000 | 58.0 | 10.4 | 9.7 | 57.9 | 10.5 | 9.7 |
| 11 |  (morpholinyl) | 92/10 | 1.5025 | 49.1 | 8.9 | 9.5 | 48.8 | 9.2 | 9.4 |
| 12 | $CH_3$N⟨N⟩— (N-methylpiperazinyl) | 95/10 | 1.5045 | 52.5 | 10.0 | 17.5 | 52.7 | 10.1 | 17.1 |
| 13 | —N⟨N⟩— (piperazinyl) | 96/0.03 | | 46.6 | 8.8 | 13.6 | 46.4 | 8.9 | 13.6 |
| *14 | $HOCH_2CH_2NCH_3$— | 78/0.9 | 1.4977 | 44.4 | 9.6 | 10.4 | 44.7 | 9.6 | 10.2 |

EXAMPLE 10.—2-MERCAPTOETHYL CARBAMATES (a) Carbamates 1–9, Table III, were prepared by allowing a mixture of 0.55 mole of ethylene monothiolcarbonate, 0.5 mole of amine and 500 ml. of dioxane to stand at 25–30° C. for a reaction period indicated in Table I. The mixture was then subjected to distillation, initially under water pump vacuum to remove solvent and unreacted starting materials, and then by vacuum pump to yield analytically pure product. Due to its high boiling point, distillation of the carbamate from benzylamine (No. 9, Table III) was effected through a 3″ unpacked column.

(b) The biscarbamates of piperazine and ethylene diamine (No. 10 and 11, Table III) were prepared by the same procedure as in (a) except that 0.25 mole of starting amine was used. Both biscarbamates crystallized after removal of solvent, and were recrystallized twice from ethanol.

Table III

2-MERCAPTOETHYL CARBAMATES
G[CO₂ CH₂ CH₂ SH]n

| | G | n | Percent Yield for Reaction Time (hrs.) of | | | | B.P./mm. or M.P. (° C.) | $n_D^{25}$ | Analysis, percent | | | | | | | |
|---|---|---|---|---|---|---|---|---|---|---|---|---|---|---|---|---|
| | | | | | | | | | Calculated | | | | Found | | | |
| | | | 15 | 60 | 90 | 170 | | | C | H | N | S | C | H | N | S |
| 1 | n-C₄H₉NH— | 1 | 80 | | | | 98/0.5 | 1.4782 | 47.5 | 8.5 | 7.9 | 18.1 | 47.4 | 8.6 | 7.9 | 18.1 |
| 2 | n-C₆H₁₃NH— | 1 | 83 | | | | 134/0.3 | 1.4755 | 52.7 | 9.3 | 6.8 | 15.6 | 52.7 | 8.9 | 7.2 | 15.7 |
| 3 | CH₂=CHCH₂NH— | 1 | 43 | 69 | 81 | | 83/0.2 | 1.4978 | 44.7 | 6.8 | 8.7 | 19.9 | 43.9 | 6.9 | 8.4 | 20.1 |
| 4 | (CH₃)₂CHNH— | 1 | 10 | | 44 | 50 | 93/1.0 | 1.4792 | 44.2 | 8.0 | 8.6 | 19.6 | 44.6 | 8.4 | 8.8 | 19.6 |
| 5 | (n-C₄H₉)₂N— | 1 | 0 | | | 34 | 106/0.6 | 1.4660 | 56.7 | 9.9 | 6.0 | 13.7 | 57.2 | 10.2 | 6.2 | 14.0 |
| 6 | O⟨ ⟩N— | 1 | 60 | 78 | 86 | | 108/0.6 | 1.5058 | 44.0 | 6.8 | 7.3 | 16.8 | 44.2 | 6.9 | 7.0 | 16.5 |
| 7 | ⟨ ⟩N— | 1 | 82 | | | | 83/0.1 | 1.5038 | 50.8 | 7.9 | 7.4 | 16.9 | 50.5 | 8.3 | 7.9 | 16.9 |
| 8 | CH₃N⟨ ⟩N— | 1 | 82 | | | | 118/1.0 | 1.5078 | 47.1 | 7.8 | 13.7 | 15.7 | 46.8 | 8.1 | 13.6 | 15.5 |
| 9 | C₆H₅CH₂NH— | 1 | 56 | | | | 151/0.05 | 1.5531 | 56.8 | 6.2 | 6.6 | 15.2 | 57.6 | 6.6 | 7.6 | 15.2 |
| 10 | —N⟨ ⟩N— | 2 | 86 | | | | 72–74 | | 40.8 | 6.1 | 9.5 | 21.8 | 41.0 | 6.2 | 9.9 | 21.6 |
| 11 | —HNCH₂CH₂NH— | 2 | 70 | | | | 101–104 | | 35.8 | 6.0 | 10.4 | 23.9 | 36.6 | 6.5 | 9.9 | 23.9 |

EXAMPLE 11

A mixture of 0.5 mole of GCO₂CH₂CH₂SQ, 1.5 mole of morpholine, and 250 ml. of toluene were refluxed overnight under an efficient condenser. Isolation of the product, 2-morpholinoethanethiol, was effected by distillation under reduced pressure through a 14" Vigreux column equipped with a variable take-off head. The yields of 2-morpholinoethanethiol are listed in Table IV.

Table IV

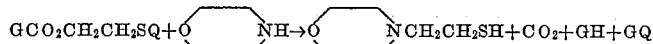

GCO₂CH₂CH₂SQ + O⟨ ⟩NH → O⟨ ⟩NCH₂CH₂SH + CO₂ + GH + GQ

| G | Q | Percent Yield O⟨ ⟩NCH₂CH₂SH | Percent Purity of— O⟨ ⟩NCH₂CH₂SH |
|---|---|---|---|
| O⟨ ⟩N— | H | 87 | |
| C₆H₅NH— | H | 85 | |
| n-C₄H₉NH— | H | 74 | |
| n-C₄H₉NH— | —COC₃H₇-n | 68 | 98 |
| n-C₄H₉NH— | —CO₂C₆H₁₃-n | 72 | 97 |
| n-C₄H₉NH— | —C(—NH)NH₂·HCl | 47 | 98 |
| n-C₄H₉NH— | —CONHC₄H₉-n | 65 | 99 |

My process of mercaptoethylating amines with ethylene monothiolcarbonate has many advantages over systems using ethylene sulfide since my mercaptoethylating agent is stable and may be stored under normal conditions. Good yields of mercaptoethylated products are obtained without formation of polyethylene sulfide. This new process of mercaptoethylating amines is to be preferred over the reactions involving 2-chloroethylamines because of the more readily available starting materials.

The reactants can be dissolved in suitable inert common solvents, such as toluene, dioxane, xylene and the like and heated to the reflux temperature of the solvent used.

The aminoethanethiols of this invention may be used in photography for various purposes. For example, it is well known in photography to fix silver halide emulsion layers subsequent to development in order to stabilize the silver image. Instead of this procedure the aminoethanethiols may be applied to the developed print in vapor form from a boiling aqueous solution with the result that a stable silver complex is formed. This procedure obviates the usual fixing and washing steps. However, the aminoethanethoils may be used in solutions for fixing prints in the usual manner, in which case they form soluble salts with residual silver halide which can be readily washed out of the print. The solutions may further contain organic colliod hardening agents such as alumnium formoacetate, glutaraldehyde and potassium alum. The aminothiols will dissolve silver halide in acid solution whereas thiols lacking an amino substituent, such as mercaptoacetic acid, require alkaline conditions for fixing.

The invention has been described in detail with particular reference to the preferred embodiments thereof, but it will be understood that variations and modifications can be effected within the spirit and scope of the invention, as described herein-above, and as defined in the appended claims.

I claim:

1. A method of producing 2-diethylaminoethanethiol which consists in contacting more than one mole of diethylamine with one mole of ethylene monothiolcarbonate.

2. A method of producing 2-di-n-butylaminoethanethiol which consists in contacting more than one mole of di-n-butylamine with one mole of ethylene monothiolcarbonate.

3. The method of producing 2-isopropylaminoethanethiol which consists in contacting more than one mole of isopropylamine with one mole of ethylene monothiolcarbonate.

4. The method of producing 2-n-decylaminoethanethiol which consists in contacting more than one mole of n-decylamine with one mole of ethylene monothiolcarbonate.

5. The method of producing 2-morpholinoethanethiol which consists in contacting more than one mole of morpholine with one mole of ethylene monothiolcarbonate.

6. The process which comprises contacting ethylene monothiolcarbonate with a stoichiometric excess of an organic amine selected from the group consisting of:
 (a) primary organic amines and
 (b) secondary organic amines.

References Cited by the Examiner

UNITED STATES PATENTS

| | | | |
|---|---|---|---|
| 2,448,767 | 9/48 | Carlson | 260—609 |
| 2,627,524 | 2/53 | Malkemus | 260—482 |
| 2,802,022 | 8/57 | Groszos et al. | 260—482 |
| 2,806,838 | 9/57 | Melamed | 260—471 |
| 2,928,812 | 3/60 | Ernst | 260—482 |
| 3,072,676 | 1/63 | Johnson et al. | 260—377 |

FOREIGN PATENTS 476,305 12/52 Italy.

OTHER REFERENCES

Conant: "The Chemistry of Organic Compounds" (textbook) page 269 (1934).

Najer et al.: Bulletin de la Societie Chimique des France (1954), pages 1142–1148.

NICHOLAS S. RIZZO, *Primary Examiner.*

IRVING MARCUS, *Examiner.*